(12) United States Patent
Gutierrez et al.

(10) Patent No.: US 6,886,414 B2
(45) Date of Patent: May 3, 2005

(54) POWER GENERATING METER

(75) Inventors: Francisco M. Gutierrez, League City, TX (US); Rick D. Atton, Spring, TX (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/419,522

(22) Filed: Apr. 21, 2003

(65) Prior Publication Data

US 2004/0206174 A1 Oct. 21, 2004

(51) Int. Cl.$^7$ ............................................. G01F 15/06
(52) U.S. Cl. ................................................. 73/861.78
(58) Field of Search ......................... 73/861.74, 861.75, 73/861.77, 861.78, 861.79, 861.87; 340/506; 417/108–110, 118; 290/43, 54, 52

(56) References Cited

U.S. PATENT DOCUMENTS

| | | |
|---|---|---|
| 2,991,652 A | 7/1961 | Bassett |
| 3,555,902 A | 1/1971 | Onoda et al. |
| 3,581,566 A | 6/1971 | Goff et al. |
| 3,599,022 A | 8/1971 | Adair |
| 3,685,353 A | 8/1972 | Gestler et al. |
| 3,772,917 A | 11/1973 | Lutz et al. |
| 3,820,090 A | 6/1974 | Wiegand |
| 4,150,314 A | 4/1979 | Zabler et al. |
| 4,247,601 A | 1/1981 | Wiegand |
| 4,263,523 A | 4/1981 | Wiegand |
| 4,265,127 A | 5/1981 | Onoda |
| 4,276,482 A * | 6/1981 | Crockett ....................... 290/52 |
| 4,409,848 A | 10/1983 | Lutz |
| 4,593,209 A | 6/1986 | Sloan |
| 4,736,122 A | 4/1988 | Opie et al. |
| 4,743,780 A | 5/1988 | Opie |
| 4,758,742 A | 7/1988 | Opie |
| 4,793,192 A | 12/1988 | Jerger et al. |
| 5,199,307 A | 4/1993 | Onoda et al. |
| 5,216,924 A * | 6/1993 | Le Breton ................ 73/152.35 |
| 5,530,298 A | 6/1996 | Gerhold |
| 5,675,092 A * | 10/1997 | Denis ....................... 73/861.78 |
| 6,191,687 B1 | 2/2001 | Dlugos et al. |
| 6,523,427 B1 | 2/2003 | Ferguson |
| 2002/0083778 A1 | 7/2002 | Hamilton |

* cited by examiner

Primary Examiner—Harshad Patel
(74) Attorney, Agent, or Firm—Fish & Richardson P.C.

(57) ABSTRACT

Flow device for generating electrical power from fluid flow. The device comprises rotatable structure driven by the fluid, which in turn drives a magnetic field generator. A magnetic sensor responsive to the magnetic field generates electrical power for powering external devices.

37 Claims, 4 Drawing Sheets

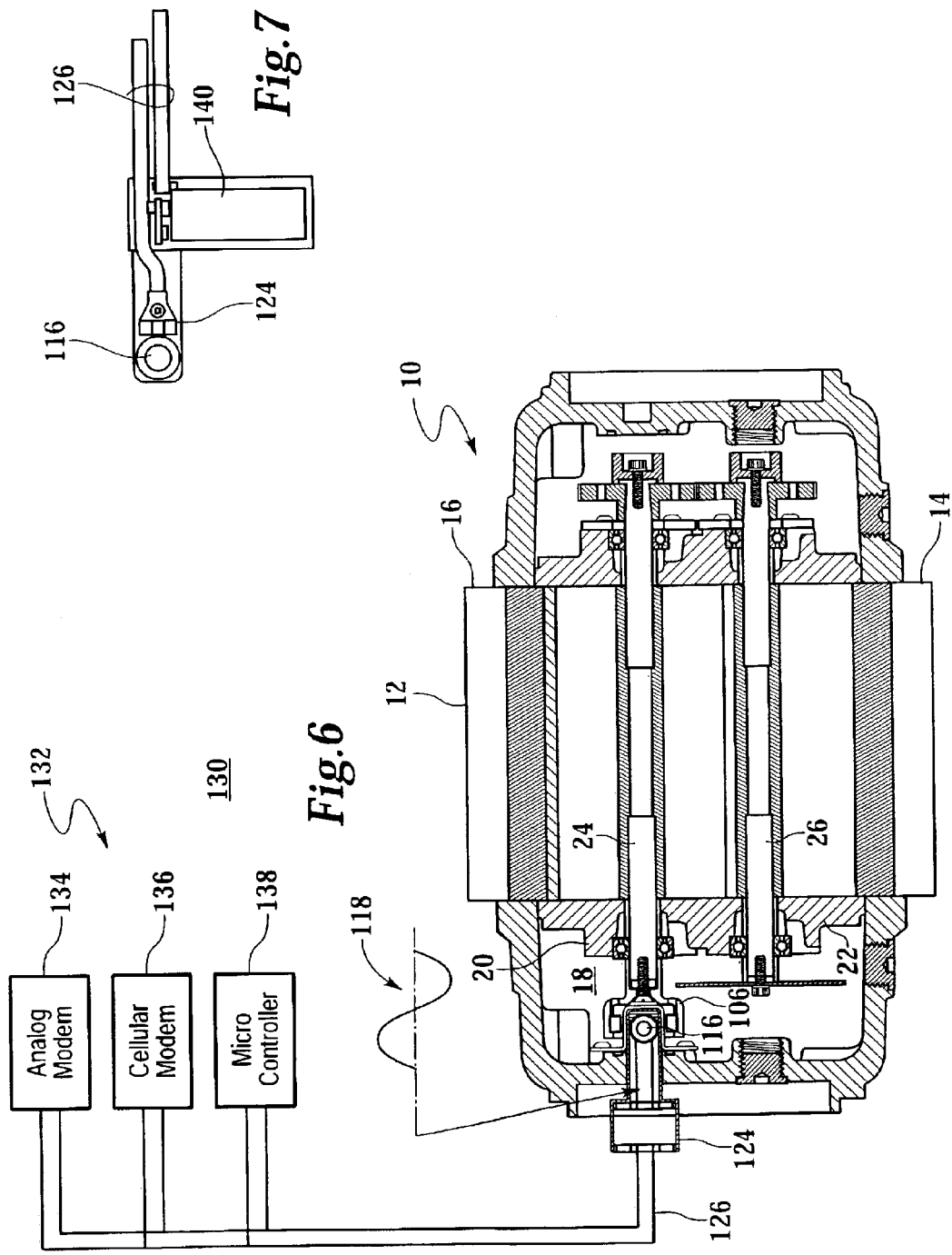

POWER GENERATING METER

FIELD OF THE INVENTION

The present invention relates generally to power generation by flow devices, and in particular rotary displacement gas meters.

BACKGROUND OF THE INVENTION

Flow meter device for measuring rate and volume of gas flowing through the meter are well known. Such meters have included electronics to generate pulses indicative of the rate and volume of the flow as well as mechanical means of metering the fluid. Further details concerning fluid metering devices can be found in U.S. Pat. No. 3,581,566 and U.S. Pat. No. 6,523,427, both of which are incorporated herein by reference in their entirety. But heretofore, no such device have been capable of outputting sufficient energy to power external devices.

SUMMARY OF THE INVENTION

An embodiment of the invention is directed toward an electric power generating device for generating power from flow of gas through a pipeline. The device comprises a body through which the fluid flows. Impellers are driven by the fluid, which, in turn, rotate a rotatable shaft. A magnet is secured to the rotatable shaft and generates an alternating magnetic field as a result of being rotated. A magnetic sensor responsive to the magnetic field generates a sinusoidal alternating current that is transmitted, via electrical wires, out of the body to sensor electronics. The sensor electronics may include rectifying circuitry that outputs a direct current output. The output from the sensor electronics can be used to power consumer electronic devices.

BRIEF DESCRIPTION OF THE DRAWINGS

FIG. 6 shows a system comprising a flow meter powering external electronic devices.

FIG. 7 shows a power sensor supplying power to a rechargeable battery.

DETAILED DESCRIPTION OF PREFERRED EMBODIMENTS

Figure 1:
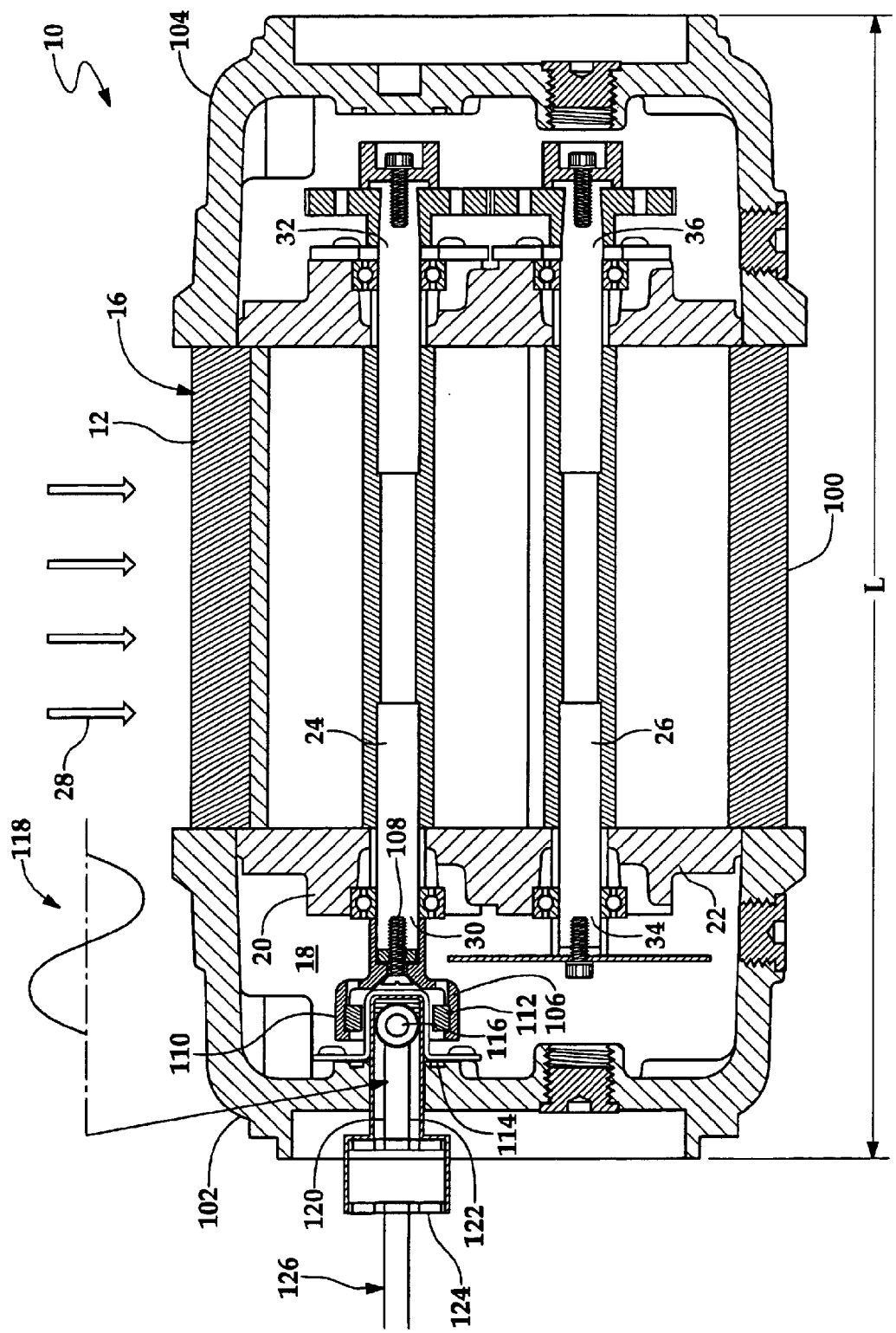
FIG. 1 shows a side section view of a flow meter comprising power generating structure.
Figure 2:
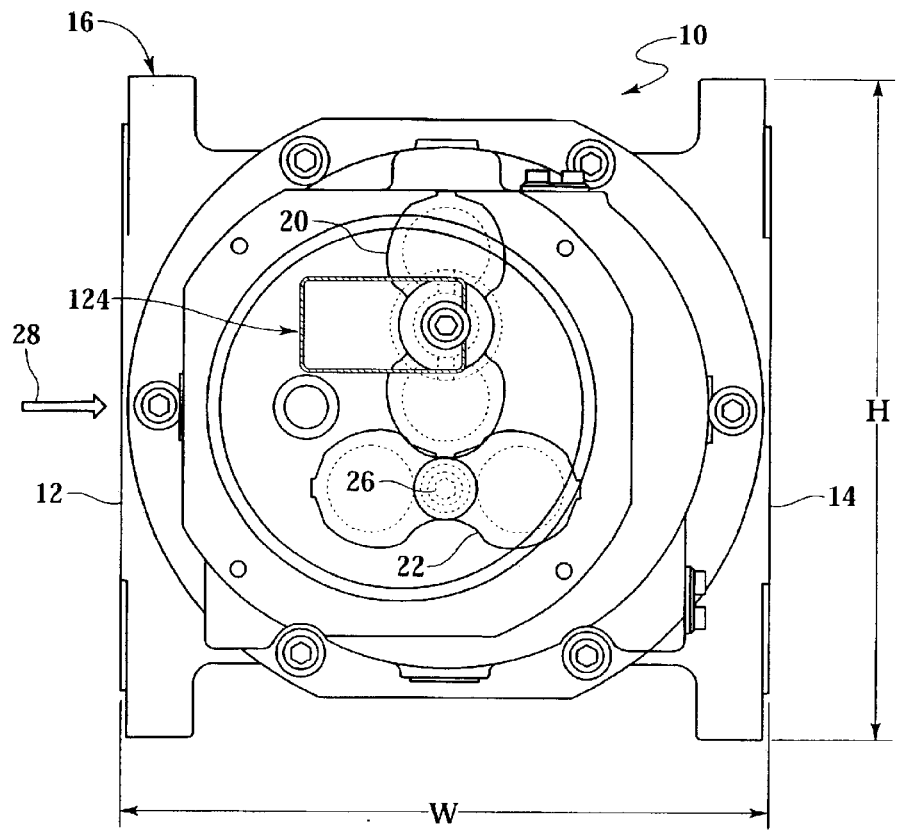
FIG. 2 is a front view of the flow meter of FIG. 1 more clearly illustrating the impellers.

FIG. 1 is an elevated side-sectional view of a flow meter 10 having an inlet 12 and an outlet 14 of a meter body 16. FIG. 2 is a front view of the flow meter 10 with the inlet 12 on the left. Meter body 16 defines a bore 18 in which first and second impellers 20 and 22 rotate. The first and second impellers 20 and 22 are mounted respectively, on first and second rotatable shafts 24 and 26. Rotatable shafts 24 and 26 are shown generally perpendicular to the flow of fluid 28 through the meter 10. In preferred embodiments, the fluid is a gas.

With reference to FIG. 2, as fluid 28 flows into inlet 12, the first (top) impeller 20 rotates clockwise and the second (bottom) impeller 22 rotates counter-clockwise. Thus, the first rotatable shaft 24 rotates clockwise and the second rotatable shaft 26 rotates counter-clockwise. The rate at which the impellers 20 and 22 rotate is related to the rate at which the fluid 28 flows through the meter 10. For many applications, the rotation rate of the impellers 20 and 22, and hence rotatable shafts 24 and 26, is directly proportional to the rate at which fluid 28 flows through the meter body 16.

The first rotatable shaft 24 comprises an first end 30 and second end 32, where the first end 30 is generally proximate to an end of meter body 16 and the second end 32 is generally proximate to an opposing end of the meter body 16. Similarly, the second rotatable shaft 26 comprises a first end 34 and a second end 36.

Figure 3A:
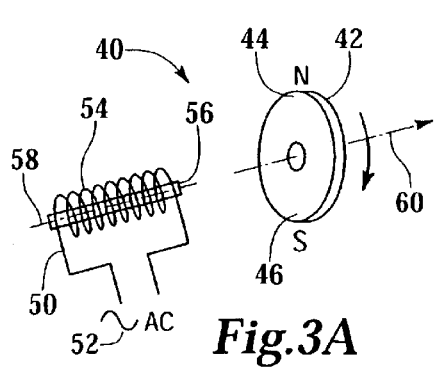
FIG. 3 shows a power generator comprising a rotating magnet and a magnetic sensor.
Figure 3B:
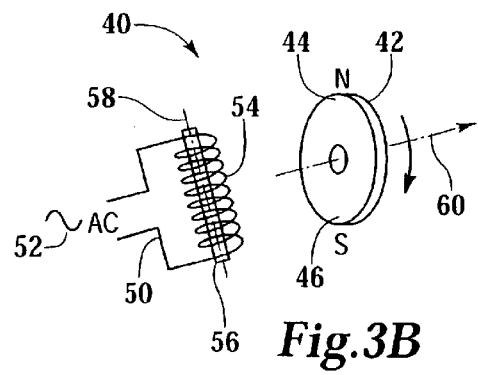

The flow meter 10 is provided with power generating structure for generating an alternating current (AC), preferably as a sinosoidal waveform to generate SAC power. The SAC power may be rectified and used as a direct current (DC) power source. FIGS. 3a and 3b illustrate power generating structure 40. The power generating structure 40 comprises a magnet 42 having at least one north pole 44 and at least one south pole 46. The magnet 42 is driven by fluid 28 flowing through the meter 10 to produce a rotating alternating magnetic field. The power generating structure 40 comprises a power generating magnetic sensor 50 that generates a SAC power waveform 52 when exposed to the rotating alternating magnetic field. The power generating magnetic sensor 50 comprises a conductor 54 wound, or coiled, around a magnetic core 56. The magnetic core 56 illustrated in FIGS. 3a and 3b is a generally straight core having a longitudinal axis 58. In FIG. 3a, the longitudinal axis 58 of the sensor 50 is generally aligned with the rotational axis 60 of the magnet 42. By contrast, in FIG. 3b, the longitudinal axis 58 is generally perpendicular to the rotational axis 60.

Figure 4:
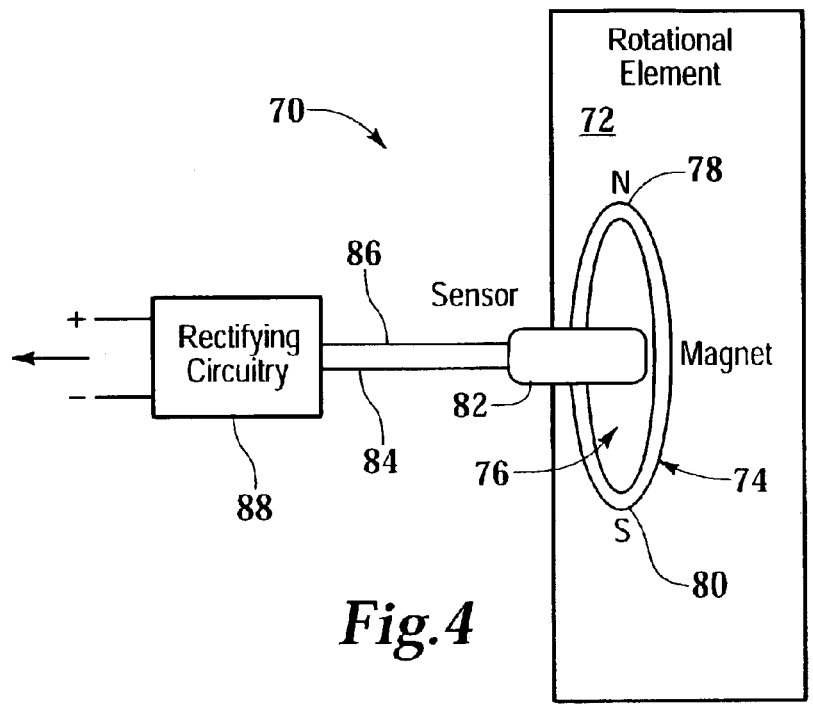
FIG. 4 shows a power generator comprising a ring magnet and magnetic sensor.
Figure 5:
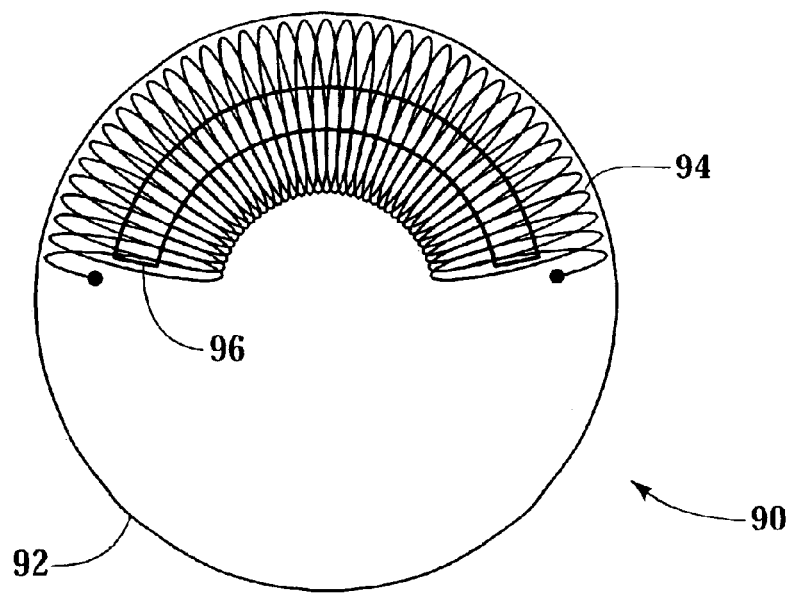
FIG. 5 shows an arced magnetic sensor.

FIG. 4 is a simplified representation of a SAC power generator 70. The power generator 70 comprises a rotational element 72 driven by fluid flow. The rotational element 72 can be driven directly or indirectly by fluid flow. The rotational element 72 supports a ring magnet 74 defining a central opening 76 and having a north pole 78 and a south pole 80. When the rotational element 72 rotates, the ring magnet 74 rotates and produces rotating alternating magnetic field. A power generating sensor 82 is positioned in the opening 76 of the ring magnet 74. A detailed example of power generating sensor 82 is illustrated in FIG. 5. The power generating sensor 82 transmits a SAC via wires 84 and 86 to rectifying circuitry 88. The rectifying circuitry 88 output DC power to power external electronic (electrical) devices. For some applications, the SAC is not passed through rectifying circuitry 88.

Although typically not a concern with respect to power generation, a ring magnet produces a drag effect that may affect accuracy of a flow meter at very low flow rates. The drag effect results from uneven attraction of a sensor's core (e.g. magnetic core 56) on the ring magnet (e.g., ring magnet 74). The sensor's core is a magnetic piece, typically of solid metal, being a cylinder having ends. If the cylinder is a straight core (e.g. core 56) and is placed inside the ring magnet 74, the ends of the cylinder 56 will be closer to the ring magnet 74 than the cross sectional (central) area of the cylinder 56. Therefore, as the poles of the ring magnet 74 rotate around the core 56, the magnetic pull from the core's ends will act as a brake every time the poles of the magnet are directly in front of the core's ends. At low flow rates, this drag effect could stop impeller rotation, rendering the meter inoperative for measurement. In some applications, this drag is reduced by balancing the distance from the core's ends to the core's cross sectional area. Preferably, the distance from the poles to the core is maintained as a constant throughout the complete rotation of the ring magnet.

FIG. 5 is a front view of a magnetic sensor 90 for generating power. The magnetic sensor 90 comprises a support plate 92 supporting an arced coil 94. An arced core 96 is positioned in the coil 94. In some applications, the arced core 96 and arced coil 94 are arced to form two half circles, rather than a complete circle.

Another embodiment of a power generator is described with reference to FIG. 1 and flow meter 10. Flow meter 10 comprises a main body 100, a first end cap 102 attached to the main body 100, and a second end cap 104 attached to the main body 100. In the first end cap 102, a ring magnet 106 is secured to the first rotatable shaft 24 with screw 108. The ring magnet 106 has a north pole 110 and a south pole 112. A unshaped bracket 114 supports magnetic sensor 116 the central opening of the ring magnet 106. A sinusoidal alternating current 118 is transmitted along wires 120 and 122 to electronics 124, which may include rectifying circuitry and in turn output a DC power supply 126. The electronics 124 are positioned outside of the first end cap 102; the sensor 116 is positioned inside the meter 10. The wires 120 and 122 pass through the first end cap 102.

With reference to FIG. 6, an electronic system 130 includes flow meter 10 external electronic devices 132; the flow meter 10—supplies power to the electronic devices 132 sufficient to operate the devices 132 The electronic devices may include, for example, analog modem 134, celluar modem 136, micro-controller 138 and other communication devices as well as other consumer electronic devices. These electronic devices are referred to herein as "consumer electronic devices" to distinguish such devices from circuit electronics and electronics used to supply power to the consumer electronic devices.

Prior art meters have generated tiny amounts of power through use of a Weigand wire. The Weigand wire is used to generate pulses by subjecting the Weigand wire to a rotating magnetic field. This Weigand effect generates a pulse that always has the same pulse width and the same pulse amplitude, independent of the rotational speed of the magnetic field. The SAC power generator, for example generator 70, by contrast generates a sinsusoidal alternating current that varies with rotational speed of the magnet which generates a rotating alternating magnetic field. The sine wave generated by the magnetic sensor 82 is generated because there is an equal amount of energy generated by the North and South poles 78 and 80 of the magnet 74 as the ring magnet 74, for example, rotates around the wires coiled on the sensor's core. As the speed of the flux lines changes, increases or decreases due to the rotational speed at which the flux lines cross the coiled wires, the output current of the wires increases or decreases. Also, as the speed of rotation increases, or decreases, the period of the generated sine wave changes accordingly.

Additionally, a Weigand wire produces very, very little power. By contrast the power generating magnetic sensor disclosed herein generates power sufficient to operate external electronic devices. Table 1 below illustrates a comparison between power achieved from a Weigand wire and power achieved from the disclosed power generator.

TABLE 1

Power Comparison

| Rotation Speed | Power Generating Sensor Power Out | Weigand Sensor Power Out |
|---|---|---|
| 200 RPM | 670 μWatts | 0.051 μWatts |
| 300 RPM | 1320 μWatts | 0.222 μWatts |
| 400 RPM | 2370 μWatts | 0.495 μWatts |
| 500 RPM | 3760 μWatts | 1.512 μWatts |
| 600 RPM | 5290 μWatts | 2.728 μWatts |
| 700 RPM | 6970 μWatts | |
| 800 RPM | 8380 μWatts | |
| 900 RPM | 10820 μWatts | |
| 1000 RPM | 13910 μWatts | 19.440 μWatts |
| 1100 RPM | 16520 μWatts | |
| 1200 RPM | 18920 μWatts | |
| 1300 RPM | 23330 μWatts | |
| 1400 RPM | 25500 μWatts | |
| 1500 RPM | 29150 μWatts | 81.500 μWatts |
| 1600 RPM | 33300 μWatts | |
| 1700 RPM | 36240 μWatts | |
| 1800 RPM | 38750 μWatts | |
| 1900 RPM | 41360 μWatts | |
| 2000 RPM | 43530 μWatts | 214.140 μWatts |
| 2100 RPM | 46020 μWatts | |
| 2200 RPM | 49300 μWatts | |
| 2500 RPM | 55430 μWatts | 404.820 μWatts |

By reference to Table 1, the power output is seen to increase with, and be directly proportional to, the rotational speed. The power output is also affected by the magnet gauss level and distance from the sensor to the rotational field. The gauss level used for the testing was 500 gauss at the sensor position. The energy generation is also a function of the sensor core 56 area and the number of turns of the sensor coil 54. The test results demonstrate that the flow meter 10 will provide enough energy to power a micro-corrector unit and have additional energy to be stored in a power storage device.

Referring to FIG. 7, power sensor 116 can also be utilized as a power source to provide energy for storage. FIG. 7 illustrates an arrangement in which the DC out 126 of the sensor electronics 124 feeds into a rechargeable battery 140. Use of a rechargeable battery 140 or a super-capacitor will allow energy to be stored for later usage. For example, when meter 10 is not running, or there is a temporary need for higher energy output than the sensor 116 can provide continuously, battery 140 can supply the required power. This use of a power (energy) storage device is very advantageous with use of communication devices, where the power necessary for transmission is high but for a limited time. Thus, the stored energy can be used for remote, as well as local, communication, be it celluar, infrared, telephonic, which may be part of a SCADA (System Control And Data Acquisition) system.

Additional energy can be obtained by gearing other magnets so that the magnets turn at a higher rate of turns than the impellers 20 and 22 of the meter 10. And independent power generation units can be implemented in a pipeline for the sole purpose of generating power. Thus, such a unit would be power generating station rather than a meter for measuring flow rate and volume. Removing the metering components allows magnets and sensors to be inserted at the outlet ends 32 and 36 of the rotatable shafts 24 and 26. These additional magnets can be added with or without speed-up gear ratios. The magnets do not have to be installed only at the ends of the impellers. Therefore, in addition to or as an alternative to the end magnets, magnets and sensors can be positioned mid-span of the impellers 20, 22 or rotatable shafts 24, 26. Speed of the impellers can also be increased by using volume reduction pipes that would speed-up the fluid, e.g., gas, flow. The higher speed would generate higher useable power outputs at flow rates that what otherwise may be rates too low for useable energy generation.

With reference to FIGS. 1 and 2, the flow meter 10 has a length L of approximately 9 inches, a width W of approximately 6 inches and a height H of approximately 6 inches. Some larger embodiments have a volume of approximately 36 inches×36 inches×36 inches. Thus, one embodiment is directed toward a power generating station attached to a pipeline, where the power generating station has a volume in the range of approximately 125 cubic inches to 64,000 cubic inches. Depending on the particular application for the power generating station, the overall volume may be smaller or larger.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for providing electric power, the system comprising:
    a body having an inlet and an outlet through which gas flows;
    a rotatable structure in the body, the rotatable structure driven by the gas;
    a magnetic field generating component coupled to the rotatable structure and located in a portion of the body that is sealed from the gas flow, the magnetic field generating component driven by the rotatable structure; and
    a sensor component responsive to the generated magnetic field to generate an electrical signal output.

2. The system of claim 1, wherein the magnetic field generated varies with rotation rate of the rotatable structure and the electrical signal output varies with the magnetic field.

3. The system of claim 2, wherein the electrical signal output comprises a sinusoidal output that is at least 500µ Watts.

4. The system of claim 1, comprising sensor electronics external to the body, wherein the sensor component is positioned in the body and electrically connected to the sensor electronics to transmit the electrical signal output to the sensor electronics.

5. The system of claim 1, comprising an energy storage device coupled to the sensor component.

6. The system of claim 5, comprising one or more consumer electronic devices coupled to the sensor component and the energy storage devices, wherein the consumer electronic devices receive power from at least one of the sensor component and the energy storage device.

7. The system of claim 1, comprising one or more consumer electronic devices coupled to the sensor component to receive power.

8. The system of claim 1, wherein the body is adapted to connect to a pipeline.

9. The system of claim 8, wherein the rotatable structure drives a meter for measuring gas flow through the body.

10. The system of claim 1, wherein the rotatable structure comprises:
    a rotatable shaft generally transverse to flow of the gas; and
    one or more impellers rotating the rotatable shaft and driven by the gas.

11. The system of claim 10, wherein the magnetic field generating component comprises a magnet rotating generally transverse to the rotatable shaft.

12. The system of claim 11, wherein the sensor component is positioned in the generated magnetic field and comprises a magnetic core and a conductor coiled about the magnetic core.

13. A flow meter comprising:
    a meter body through which fluid flows;
    a rotatable structure in the meter body, the rotatable structure driven by the fluid flow; and
    a power generator supported by the meter body, wherein the generator comprises:
        a magnetic field generating component coupled to the rotatable structure and located in a portion of the body that is sealed from the fluid flow, the magnetic field generating component rotated by the rotatable structure, and
        a sensor component positioned to be affected by the magnetic field and to generate an electrical signal output in response to the magnetic field.

14. The meter of claim 13, wherein the fluid is a liquid and the rotatable structure comprises impellers driven by the liquid.

15. The meter of claim 13, wherein the fluid is a gas and the rotatable structure comprises impellers driven by the gas.

16. The meter of claim 13, wherein the rotatable structure comprises a rotatable shaft generally perpendicular to flow of the fluid.

17. The meter of claim 16, wherein the magnetic field generating component comprises a magnet rotated by the rotatable shaft.

18. The meter of claim 17, wherein the magnet is secured to the rotatable shaft.

19. The meter of claim 18, wherein the rotatable shaft has a first end and a second end and wherein the magnet is secured to the rotatable shaft nearer to the first end than to the second end.

20. The meter of claim 19, wherein the meter body has a first end cap and the first end of the rotatable shaft is nearer to the first end cap than the second end is to the first end cap.

21. The meter of claim 17, wherein the magnet rotates in a plane transverse to the rotatable shaft.

22. The meter of claim 21, wherein the magnet is a ring magnet defining a central opening.

23. The meter of claim 22, wherein the sensor component is positioned in the central opening.

24. The meter of claim 23, wherein the sensor component comprises a conductor coiled about a magnetic core.

25. The meter of claim 13, wherein the sensor component comprises a conductor coiled about a core.

26. The meter of claim 25, wherein the magnetic core is arced and forms two separated half-circles.

27. The meter of claim 13, comprising sensor electronics electrically connected to the sensor component, wherein the sensor component is positioned in the meter body and the sensor electronics are positioned outside the meter body.

28. The meter of claim 13, comprising an energy storage device connected to receive power generated by the sensor component.

29. The meter of claim 28, comprising sensor electronics connecting the energy storage device and the sensor component.

30. A flow device comprising:
   a body through which fluid flows;
   a rotatable shaft in the body, the rotatable shaft generally transverse to and driven by flow of the fluid through the body;
   a magnet coupled to the rotatable shaft and located in a portion of the body sealed from the fluid flow, the magnet rotated transversely to and by the rotatable shaft; and
   a magnetic sensor in the magnetic field generating a sinusoidal output, wherein the magnetic sensor comprises:
      a magnetic core, and
      a conductor coiled around the core.

31. The flow device of claim 30, wherein the magnet is a ring magnet defining a central opening.

32. The flow device of claim 31, wherein the magnet sensor is positioned in the central opening of the ring magnet.

33. The flow device of claim 32, wherein the magnetic core is arced and comprises at least one half-circle.

34. A flow device comprising:
   a body through which gas flows;
   a rotatable structure in the body, the rotatable structure driven by flow of gas through the body;
   a magnet coupled to the rotatable shaft and located in a portion of the body sealed from the gas flow, the magnet driven by the rotatable structure; and
   a magnetic sensor positioned in the magnetic field to generate power that varies with rotation rate of the rotatable structure, wherein the power generated is at least about 500 $\mu$Watts when the rotation rate of the rotatable structure is approximately 200 RPM.

35. The flow device of claim 34, wherein the power generated is at least about 5,000 $\mu$Watts when the rotation rate of the rotatable structure is approximately 600 RPM.

36. The flow device of claim 34, wherein the power generated is at least about 50,000 $\mu$Watts when the rotation rate of the rotatable structure is approximately 2,500 RPM.

37. The flow device of claim 34, wherein the rotatable structure comprises an impeller driven by the fluid and the power generated is at least about 500 $\mu$Watts when the impeller rotation rate is approximately 200 RPM.

* * * * *

UNITED STATES PATENT AND TRADEMARK OFFICE
CERTIFICATE OF CORRECTION

PATENT NO. : 6,886,414 B2
APPLICATION NO. : 10/419522
DATED : May 3, 2005
INVENTOR(S) : Francisco M. Gutierrez and Rick D. Atton It is certified that error appears in the above-identified patent and that said Letters Patent is hereby corrected as shown below:

Col. 3, Line 20 – replace "unshaped" with -- u-shaped --

Col. 5, Line 58 – replace "device" with -- devices --

Signed and Sealed this

Twenty-second Day of May, 2007

JON W. DUDAS
*Director of the United States Patent and Trademark Office*